(12) United States Patent
Reddy et al.

(10) Patent No.: US 8,694,554 B2
(45) Date of Patent: *Apr. 8, 2014

(54) CLUSTER STORAGE USING SUBSEGMENTING FOR EFFICIENT STORAGE

(75) Inventors: Sazzala Reddy, Sunnyvale, CA (US); Umesh Maheshwari, San Jose, CA (US); Edward K. Lee, San Jose, CA (US); R. Hugo Patterson, Los Altos, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/179,164

(22) Filed: Jul. 8, 2011

(65) Prior Publication Data

US 2011/0270887 A1 Nov. 3, 2011

Related U.S. Application Data

(63) Continuation of application No. 11/824,592, filed on Jun. 29, 2007, now Pat. No. 8,005,861.

(60) Provisional application No. 60/925,514, filed on Apr. 19, 2007, provisional application No. 60/923,066, filed on Apr. 11, 2007, provisional application No. 60/922,996, filed on Apr. 11, 2007.

(51) Int. Cl.
*G06F 17/30* (2006.01)

(52) U.S. Cl.
USPC .................................................. 707/802

(58) Field of Classification Search
USPC .................................................. 707/802
See application file for complete search history.

(56) References Cited

U.S. PATENT DOCUMENTS

| | | | |
|---|---|---|---|
| 6,393,426 B1 * | 5/2002 | Odom et al. | 1/1 |
| 6,928,526 B1 | 8/2005 | Zhu et al. | |
| 7,007,069 B2 * | 2/2006 | Newman et al. | 709/206 |
| 7,107,550 B2 * | 9/2006 | Newman | 715/853 |
| 7,111,253 B2 * | 9/2006 | Newman | 715/854 |
| 7,231,415 B1 * | 6/2007 | Eslambolchi et al. | 709/200 |
| 7,280,957 B2 * | 10/2007 | Newman et al. | 704/9 |
| 7,389,462 B1 * | 6/2008 | Wang et al. | 714/748 |
| 7,460,473 B1 * | 12/2008 | Kodama et al. | 370/230 |
| 7,594,002 B1 * | 9/2009 | Thorpe et al. | 709/219 |
| 7,624,335 B1 * | 11/2009 | Maheshwari et al. | 714/807 |
| 7,962,520 B2 * | 6/2011 | Patterson et al. | 707/791 |
| 2006/0253418 A1 * | 11/2006 | Charnock et al. | 707/1 |
| 2007/0061487 A1 * | 3/2007 | Moore et al. | 709/246 |
| 2007/0288638 A1 * | 12/2007 | Vuong et al. | 709/226 |

* cited by examiner

*Primary Examiner* — Sheree Brown
(74) *Attorney, Agent, or Firm* — Van Pelt, Yi & James LLP

(57) ABSTRACT

Cluster storage is disclosed. A data stream or a data block is received. The data stream or the data block is broken into segments. For each segment, a cluster node is selected, and a portion of the segment smaller than the segment is identified that is a duplicate of a portion of a segment already managed by the cluster node.

17 Claims, 10 Drawing Sheets

CLUSTER STORAGE USING SUBSEGMENTING FOR EFFICIENT STORAGE

CROSS REFERENCE TO OTHER APPLICATIONS

This application is a continuation of co-pending U.S. patent application Ser. No. 11/824,592, entitled CLUSTER STORAGE USING SUBSEGMENTING FOR EFFICIENT STORAGE filed Jun. 29, 2007 which is incorporated herein by reference for all purposes, which claims priority to U.S. Provisional Application No. 60/925,514 entitled SUBSEGMENTING FOR EFFICIENT STORAGE, RESEMBLANCE DETERMINATION, AND TRANSMISSION filed Apr. 19, 2007 which is incorporated herein by reference for all purposes; and claims priority to U.S. Provisional Patent Application No. 60/923,066 entitled CLUSTER STORAGE USING SUBSEGMENTING filed Apr. 11, 2007 which is incorporated herein by reference for all purposes; and claims priority to U.S. Provisional Patent Application No. 60/922,996 entitled CLUSTER STORAGE USING DELTA COMPRESSION filed Apr. 11, 2007 which is incorporated herein by reference for all purposes.

BACKGROUND OF THE INVENTION

Scaling data storage systems to hold more information is important as data storage users continue to increase their desired storage requirements. One approach is to aggregate multiple individual storage systems into a cluster that combines the capacity and performance of the multiple individual nodes into one. However, in order to scale smoothly, each node of the cluster must be used appropriately in terms of data stored on the node and processing and throughput required by the node.

Some storage systems optimize storage by eliminating redundant copies of stored data which is known as deduplication. In some cases, stored data is divided into segments. A new segment that is desired to be stored is first compared against those segments already stored. If the segment is already stored on the system, a reference is stored in place of the new segment instead of the entire segment. This form of deduplication is referred to as identity compression.

In using identity compression with a cluster, in order to achieve high efficiency and find a matching segment, each node ideally searches all stored segments in all nodes and in addition can reference, using an index, all segments in all nodes. The ability to search and index all segments on all nodes poses problems in scaling to a large number of nodes because each node must maintain its ability to search and index over all segments stored on each node of the cluster.

It is useful in scaling storage using a cluster approach to divide the segments among the nodes so that a single node does not need to maintain its ability to search and index over all segments stored on each node of the cluster. Such division is sometimes based on a hash of the segment so that, given a segment, a hash can be computed and the node that would have the segment, if it already exists in the cluster, can be identified. Because each node only stores some of the segments, each node only needs to index some of the segments. Unfortunately, in assigning segments to different nodes based on a hash of the segment, locality and therefore performance can be lost. Ideally, segments accessed sequentially should be stored sequentially on a disk so that a single disk access can retrieve many related segments at once. Assigning sequential segments to different nodes makes it difficult, in general, to store the segments sequentially.

BRIEF DESCRIPTION OF THE DRAWINGS

Various embodiments of the invention are disclosed in the following detailed description and the accompanying drawings.

DETAILED DESCRIPTION

Figure 1:
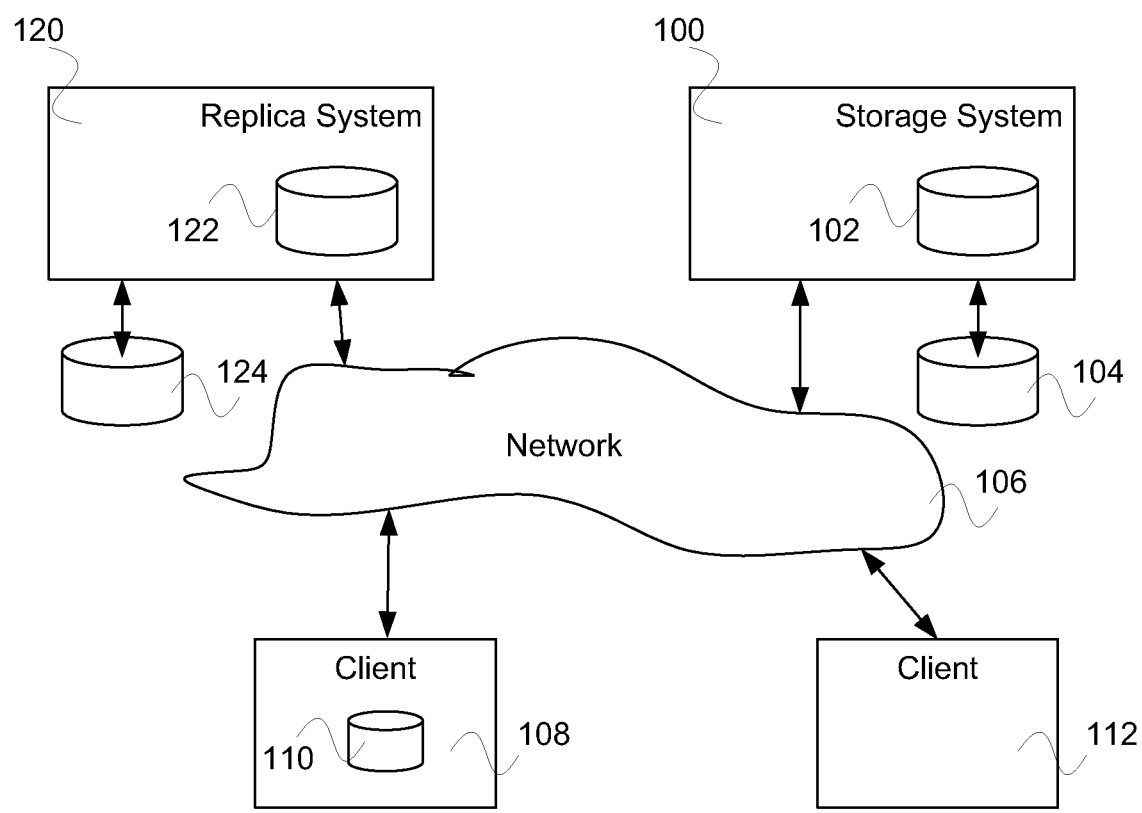
FIG. 1 is a block diagram illustrating an embodiment of a system for cluster storage using subsegmenting.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cluster storage is disclosed. A storage system uses a cluster of nodes to store in-coming data. In-coming data is segmented. Each segment is characterized for assignment for storage on a given node. On the given node of the cluster, segments are stored in a manner that finds and eliminates portions of the segment that are duplicates of data already indexed on the node. Sorting segments into a plurality of nodes reduces the number of segments to be searched for deduplication and reduces the size of the index required for a given segment on a node.

In various embodiments, a cluster node is associated with the segment based at least in part on a computed hash of all or some of the content of the segment, on a function of less than all the bytes in the segment (e.g., the initial bytes, the ending bytes, algorithmically determined sample of bytes, etc.), on hashes computed on subsegments of the segment (e.g., hashes computed on a portion of a segment that is smaller than the entire segment), on a sketch of the segment, on a content based tag associated with the segment, determining which cluster nodes have matches for subsegments of the segment, on node capacities (e.g., remaining storage capacity, used storage capacity, etc.) or capabilities, or any other appropriate available resource associated with the node. In some embodiments, determining which cluster nodes have matches for subsegments of the segment is based at least in part on hashes of subsegments or a summary data structure such as a Bloom filter. In some embodiments, a cluster node's capacity or other capabilities are considered in assigning a segment to a cluster node.

On each node of the cluster, duplicate portions of the segment are found using subsegmenting. Subsegmenting allows the use of large segments for distributing efficiently to nodes and smaller subsegments for efficiency of compression on a given node while allowing sequentially accessed subsegments to be stored sequentially. In some embodiments, a subsegment reference is stored on more than one node so that subsegment references can be read sequentially. Subsegmenting efficiently stores segments that contain subsegments that are identical to other subsegments by storing a reference to identical previously stored subsegments. If a subsegment has not been previously stored, the new subsegment is stored. Reconstruction of the segment is enabled by using the references to subsegments and the newly stored subsegments and information on how to put the subsegments together to make the segment.

In some embodiments, more than one cluster node will include a previously stored given subsegment. This situation can arise when a first segment is assigned to a first node and a second segment with an identical subsegment is assigned to a second node. This enables reading the first segment more efficiently because reading needs only to take place from the first node, and similarly reading the second segment needs only to take place from the second node.

In various embodiments, selecting a cluster node is based at least in part on one or more of the following: one or more segments that are already stored on the node, one or more similar segments that are already managed by the node, one or more identical subsegments already managed by the node, or any other appropriate segment or subsegment to base a selection of a cluster node.

In some embodiments, the segments and/or subsegments are created based at least in part on the content of the data in the stream. In some embodiments, they are created using an anchoring function. In various embodiments, the anchoring function includes computing a hash of a sliding window of bytes, determining if the computed hash meets one or more predetermined criteria, and/or establishing a boundary in an algorithmic manner in or around the sliding window of bytes. In some embodiments, a window is defined and a minimum or maximum value of a computed function (e.g., a hash or other function) or of a value of data anywhere within the window is used to define a segment or subsegment. In some embodiments, a window is defined that includes a plurality of subsegments. A hash of the first, all, or a selection of bytes of each subsegment is calculated and the maximum or minimum hash value within the window is selected to begin a next segment.

FIG. 1 is a block diagram illustrating an embodiment of a system for cluster storage using subsegmenting. In the example shown, storage system 100 stores data for clients represented in FIG. 1 by client 112 and client 108. A client may have local storage device in addition to local memory. For example, client 108 has storage 110 whereas client 112 does not have a local storage device. Storage system 100 stores data either using internal storage device 102 or attached external storage device 104.

Storage system 100 communicates with clients via network 106. Network 106 comprises one or more of the following: a local area network, a wide area network, a wired network, a wireless network, the Internet, a fiber network, or any other appropriate network enabling communication. Storage system 100 communicates with replica system 120 via network 106 as well. Replica system 120 includes internal storage device 122 and is connected to external storage device 124.

Replica system 120 stores all or a portion of data stored on storage system 100. Initially, all or the portion of data stored on storage system 100 is replicated on replica system 120 by sending appropriate data via network 106. After the initial seeding, replica system 120 is updated by sending from storage system 100 new data. Updating can be continuous, sent in bursts on a regular schedule, when the amount of data exceeds a certain size, or at other appropriate times.

In various embodiments, storage devices 102, 104, 122, and 124 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Figure 2:
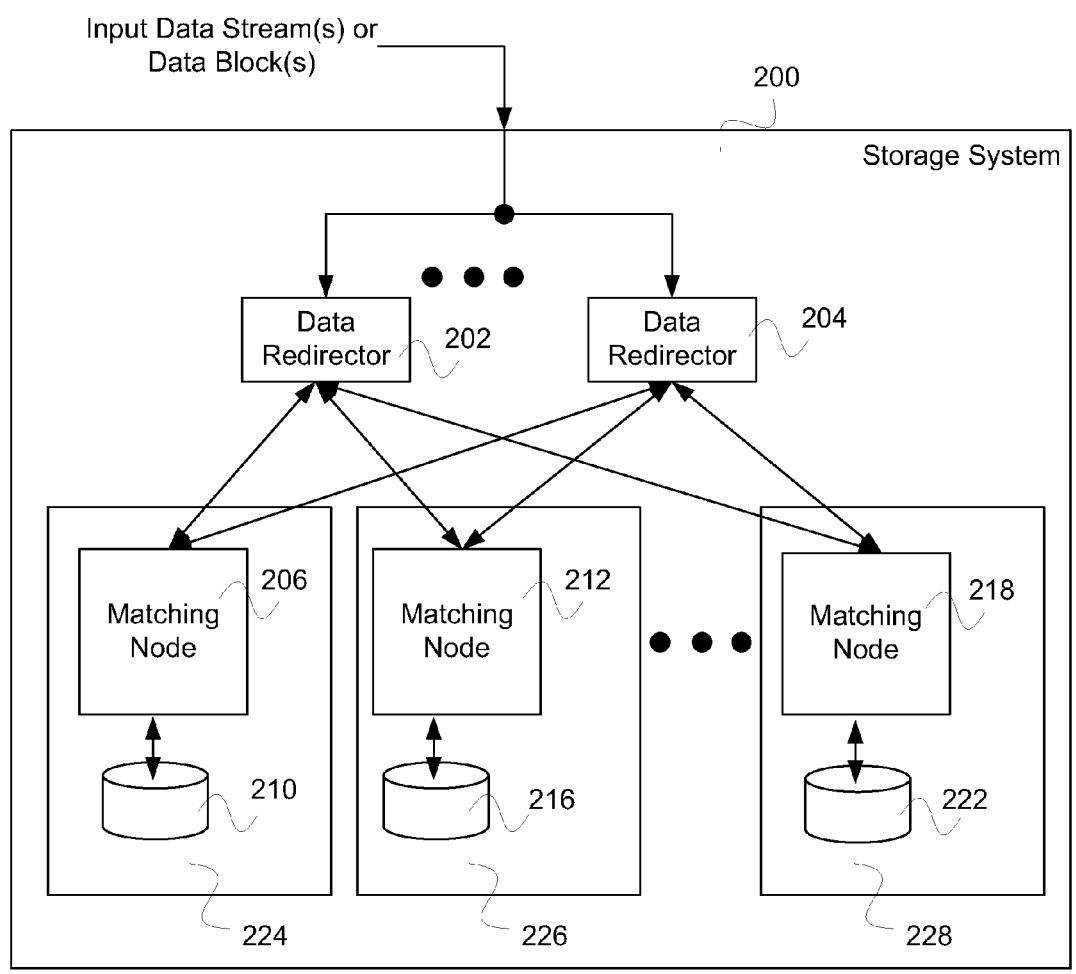
FIG. 2 is a block diagram illustrating a storage system using cluster storage.

FIG. 2 is a block diagram illustrating a storage system using cluster storage. In some embodiments, storage system 200 is used to implement storage system 100 or replica system 120 of FIG. 1. In various embodiments, replica system 120 receives a data stream, data segments, subsegments that have not previously been stored, and/or references to previously stored subsegments instead of all segments of a data stream or data block. In the example shown, storage system 200 receives one or more data streams or data blocks. The data streams or data blocks are processed by a plurality of data redirectors, represented in FIG. 2 by 202 and 204. A data redirector takes an input data stream or data block and breaks up the data stream or block into segments. In some embodiments, a segment is created using an anchoring function in which a hash of a sliding window of bytes is computed; if the hash meets some predetermined criteria, then a boundary between segments is established in an algorithmic way in or around the sliding window. In some embodiments, a window is defined that includes a plurality of subsegments within which a hash of the first bytes of each subsegment is calculated and the maximum or minimum hash value within the window is selected to begin a next segment.

In various embodiments, a segment or subsegment boundary is determined using a value of a function calculated for a plurality of windows within a segmentation window. A plurality of values are computed that are associated with candidate boundaries within the segmentation window. One of the candidate boundaries is selected based at least in part on a comparison between two or more of the computed values. A boundary within the segmentation window is determined. In some embodiments, a segmentation window can be determined by determining a first location corresponding to a minimum segment length and determining a second location corresponding to a maximum length where the segmentation window is the segment from the first location to the second location. Determining a boundary can include determining a plurality of windows within the segmentation window. Each window corresponds to a location within the segmentation window and is associated with a candidate boundary. In some embodiments, a function is then evaluated for each window. The function has as its inputs one or more data values of the window. In various embodiments, the function comprises a hash function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated—for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, a criteria of selecting the location that maximizes or minimizes the segment length could be adopted.

In the example shown, cluster node 224 includes matching node 206 and storage device 210; cluster node 226 includes matching node 212 and storage device 216; cluster node 228 includes matching node 218 and storage device 222. Each matching node is responsible for managing a subset of the segments stored in the cluster. Managing a segment includes enabling finding matches or duplicates for subsegments of the segment within the subsegments of the other segments being managed, and storing a deduplicated representation of the segment in a storage node. A segment is transmitted to one or more matching function nodes, represented in FIG. 2 by 206, 212, and 218, of a cluster node, represented in FIG. 2 by 224, 226, and 228, respectively. In some embodiments, the assignment to one or more matching nodes is a function of the hash computed as part of the anchoring function. In some embodiments, the assignment is based on a function of less than all of the bytes in the segments. For example, it could be based on a function of the initial bytes of the segment, of the ending bytes of the segment, or some algorithmically determined sample of the bytes. In some embodiments, the assignment is based on one or more tags of the segment. In various embodiments, a tag comprises a summary feature set, a sketch, a hash or fingerprint of some or all of the segment or the subsegments of segment, or any other appropriate characterizer of the segment that can be used for assigning the segment to a cluster node. In some embodiments, a summary feature set is determined by selecting a plurality of either fixed length or variable length parts or shingles of a first segment; for each shingle, computing a plurality of values by applying a set of functions to each shingle; and from all the values computed for all the shingles, selecting a first subset of values. In some embodiments, the first subset of values is used in determining resemblance between the first segment and a second segment. In some embodiments, other external factors, such as bytes in neighboring segments or other available resources in a node are used to assign the segment to a matching function node. In some embodiments, the assignment is based on sending one or more tags of the segment to some or all of the matching nodes to determine if the matching node is likely to be able to identify duplicate portions of data or duplicate subsegments. In some embodiments, the assignment is based on data maintained in the Data Redirectors about the segments stored on each node such as a summary data structure—for example, a Bloom filter. In some embodiments, a function generates a value for each segment and the Data Redirectors maintain a table which maps a set of such values to each node and a segment is assigned to a node at least in part based on the mapping in such a table.

In some embodiments, the one or more matching function nodes have already stored a similar or identical segment. The segment is broken up into subsegments and the matching function node looks for matching subsegments within all or part of the data stored associated with the matching node. In some embodiments, the part of the data within which the subsegments are searched for includes previously stored segments thought to be similar to the segment.

In some embodiments, multiple matching nodes may be hosted on the same physical storage device.

Figure 3A:
FIG. 3A is a block diagram illustrating an embodiment of a data stream or a portion of a data block.

FIG. 3A is a block diagram illustrating an embodiment of a data stream or a portion of a data block. In the example shown, data stream or portion of a data block 300 is shown. Data stream or portion of a data block 300 can be data that is being backed up, data that is being stored, data that is being replicated on a remote site, or any other appropriate data stream or portion of a data block.

Figure 3B:
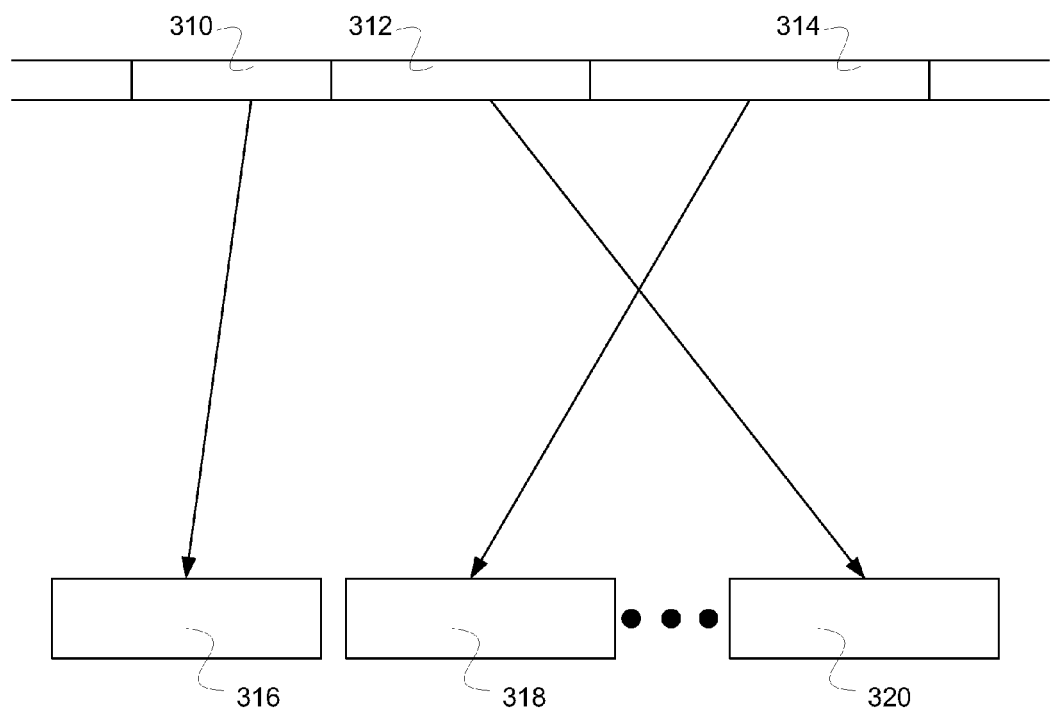
FIG. 3B is a block diagram illustrating an embodiment of a segment distributed to a cluster node.

FIG. 3B is a block diagram illustrating an embodiment of a segment distributed to a cluster node. In some embodiments, cluster nodes 316, 318, and 320 are similar to cluster nodes 224, 226, and 228 of FIG. 2. In the example shown, data stream or portion of a data block is segmented into a plurality of segments—for example, segments 310, 312, and 314. Segmenting of the data stream or portion of the data block can use content-based determination of segment boundaries (e.g., hash of content in a window is equal to a value, or hash of content in a window is the minimum or maximum of the hashes of the content of a set of windows), non-content based determination of segment boundaries (e.g., byte count), file-based segment boundaries, or any other appropriate way of breaking the data stream or data block into segments. In various embodiments, segments are the same size or are different sizes. In various embodiments, the segments may be non-overlapping or overlapping. Segments 310, 312, and 314 are distributed to cluster nodes 316, 318, and 320, respectively. Distribution of a segment to a cluster node is based on the segment content, segment number, metadata associated with the segment, and/or a cluster node having likely similar segments so that efficient storage of the segment can take place. In some embodiments, a tag or other characterization of a segment is distributed to a plurality of nodes, and a given node having likely similar segments can indicate that it would be a good candidate node for the segment to be distributed to.

Figure 4:
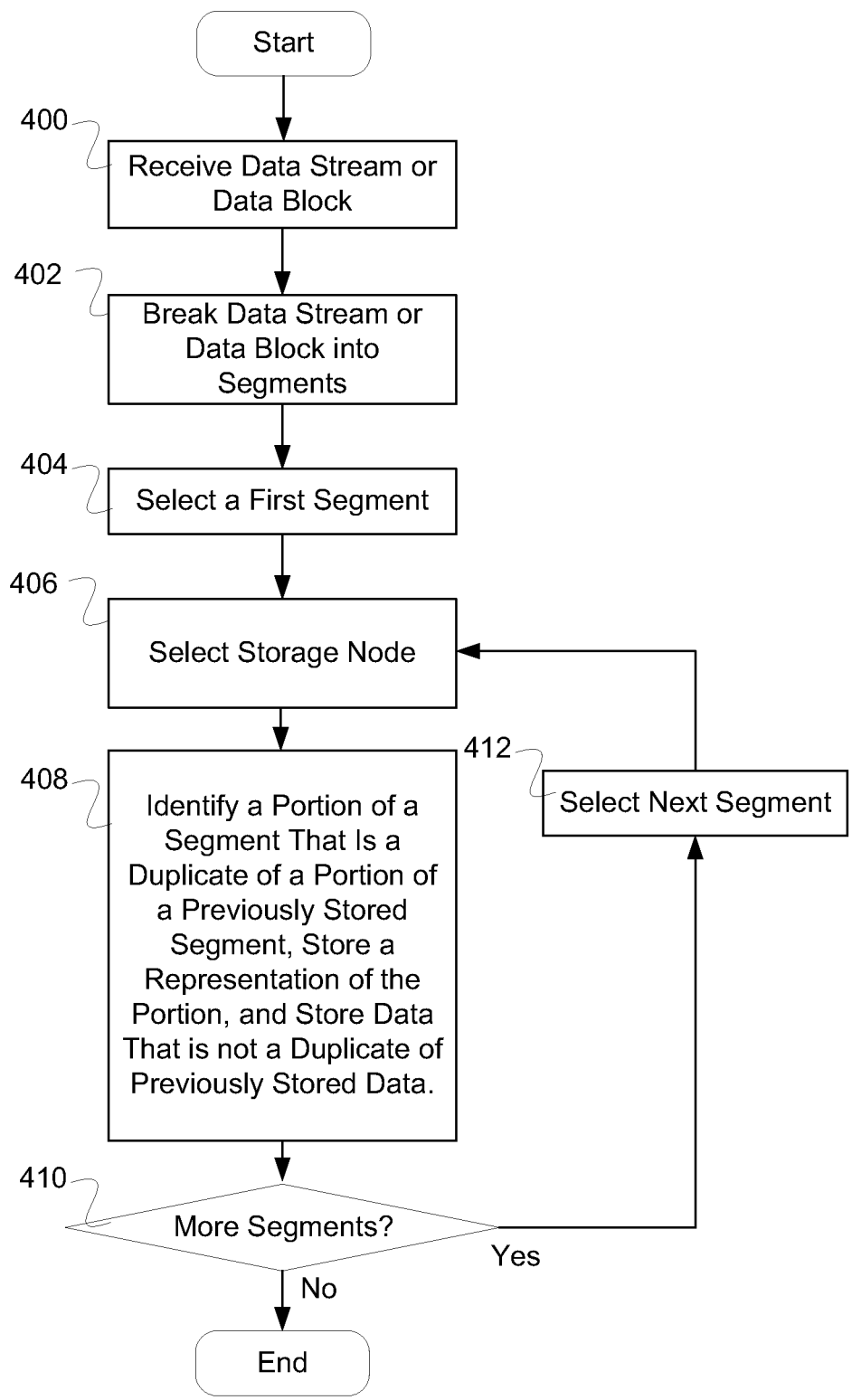
FIG. 4 is a flow diagram illustrating an embodiment of a process for cluster storage.

FIG. 4 is a flow diagram illustrating an embodiment of a process for cluster storage. In some embodiments, the process of FIG. 4 is implemented in storage system 200 of FIG. 2. In the example shown, in 400 a data stream or data block is received. In 402, the data stream or data block is broken into segments. In 404, a first segment is selected. In 406, a storage node is selected. In 408, a portion of a segment that is a duplicate of a portion of a previously stored segment is identified; a representation of the portion is stored; and data that is not a duplicate of previously stored data is stored. In 410, it is determined if there are more segments to process. If so, then in 412 a next segment is selected and control passes to 406. If not, then the process ends.

Figure 5:
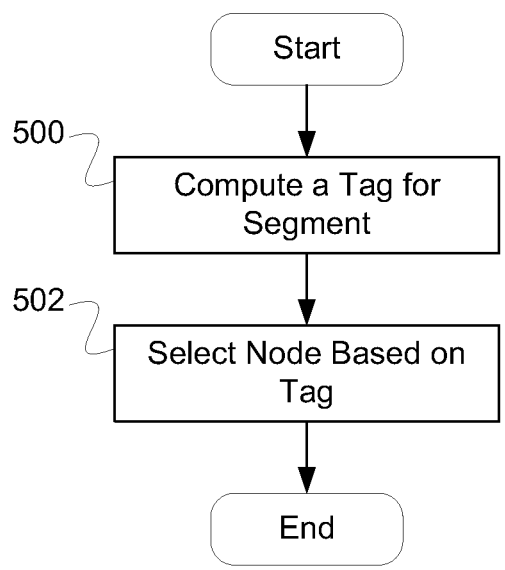
FIG. 5 is a flow diagram illustrating an embodiment of a process for selecting a storage node.

FIG. 5 is a flow diagram illustrating an embodiment of a process for selecting a storage node. In some embodiments, the process of FIG. 5 is used to implement 406 of FIG. 4. In the example shown, in 500 a tag is computed. In 502, a node is selected using the tag. In some embodiments, the segment is assigned to a node based on the tag without consideration of what segments are currently stored in the node; for example, all odd tags (e.g., a hash value) go to node 1, even tags go to node 2. Over time the nodes will have similar segments, but there is actually no check for having similar segments when the node is selected. In some embodiments, a redirector accesses a database or table which maps sets of tag values to each node to determine to which node to assign the segment. In some embodiments, a given node's loading and/or capacity is/are considered in assigning a segment to a given node. In various embodiments, the tag comprises a sketch, a hash, or any other appropriate manner of identifying likely similar segments.

In some embodiments, a redirector compares the tag to a summary data structure (e.g., a Bloom filter) that the redirector is maintaining to determine which node to assign a given segment to.

Figure 6:
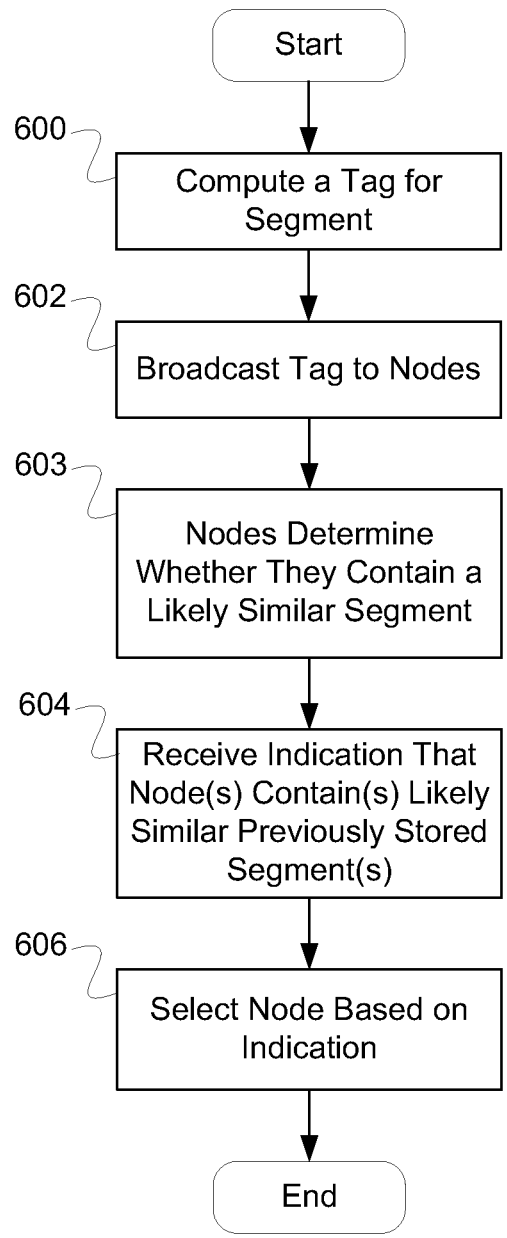
FIG. 6 is a flow diagram illustrating an embodiment of a process for selecting a storage node.

FIG. 6 is a flow diagram illustrating an embodiment of a process for selecting a storage node. In some embodiments, the process of FIG. 6 is used to implement 406 of FIG. 4. In the example shown, in 600 a tag is computed. In 602, the tag is broadcast to all nodes. In some embodiments, the tag is sent to one or more nodes but not all nodes. In some embodiments, the nodes selected to receive the tag are based at least in part on the tag. In 603, the nodes determine whether they contain a likely similar segment. The nodes could use a Bloom filter to determine if they have similar segments, or they could actually identify duplicate subsegments. In 604, an indication is received that one or more nodes likely contain(s) similar previously stored segment(s). In 606, a node is selected based on the indication. In some embodiments, the indication indicates a measure of how many likely similar stored segments are stored on a node. In some embodiments, the indication indicates the number of subsegments which match subsegments stored on a node. In some embodiments, the indication includes information regarding the overall number of stored segments at a given node so that load balancing can be considered in determining assignment of a segment. In various embodiments, the tag comprises a sketch, a hash, or any other appropriate manner of identifying likely similar segments.

Figure 7:
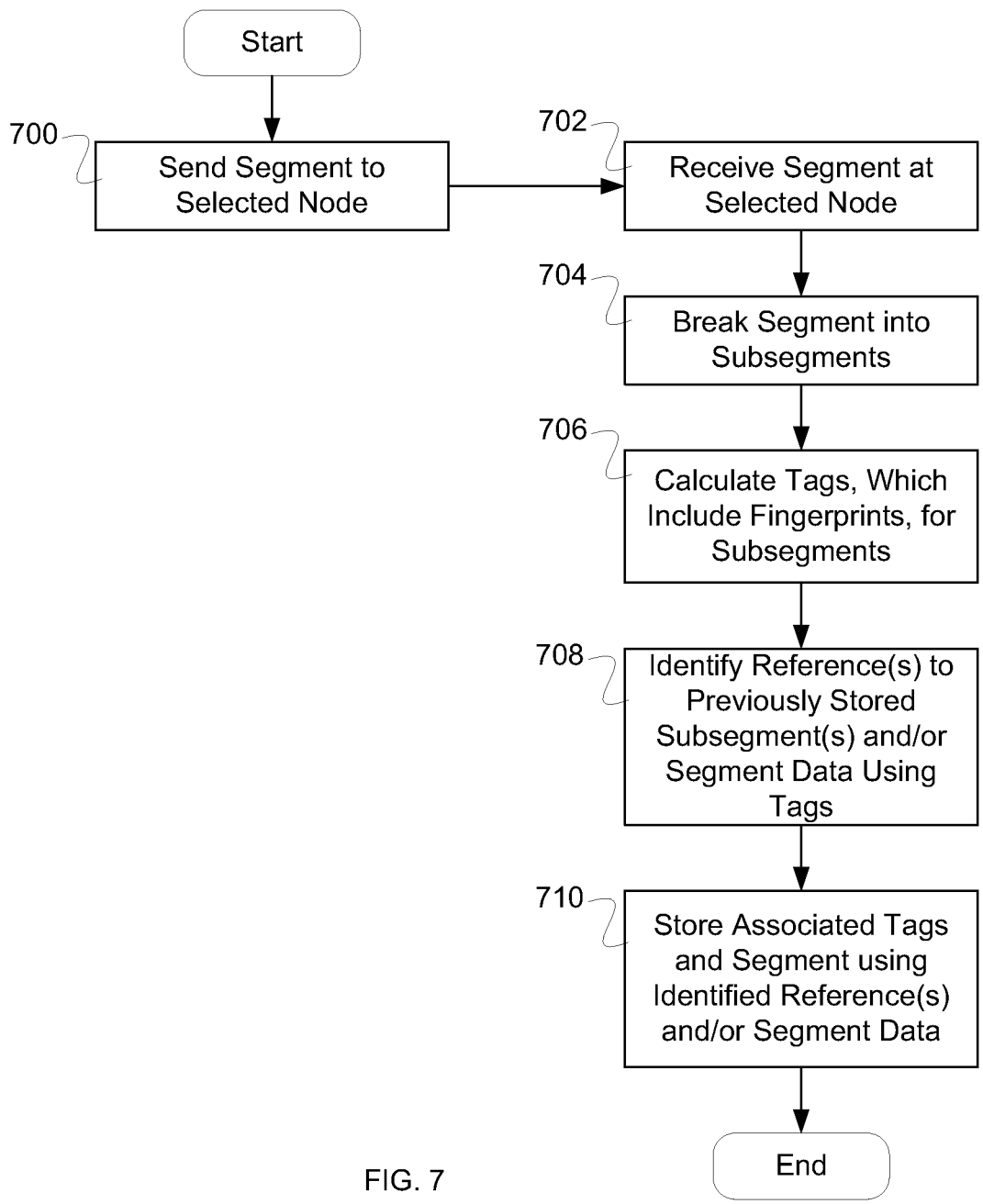
FIG. 7 is a flow diagram illustrating an embodiment of a process for storing a representation of a segment.

FIG. 7 is a flow diagram illustrating an embodiment of a process for storing a representation of a segment. In some embodiments, the process of FIG. 7 is used to implement 408 of FIG. 4. In the example shown, in 700 the segment is sent to the selected node. In 702, the segment is received at the selected node. In 704, the segment is broken into subsegments. In 706, tags, which include fingerprints, for subsegments are calculated. In 708, reference(s) to previously stored subsegment(s) and/or segment data are identified using tags. In some embodiments, fingerprints are used to identify determine if the subsegment is a duplicate of a previously stored subsegment. In some embodiments, tags are also used to identify subsegments that are not duplicates and need to be stored. In 710, associated tags and segments are stored using identified reference(s) and/or segment data.

Figure 8:
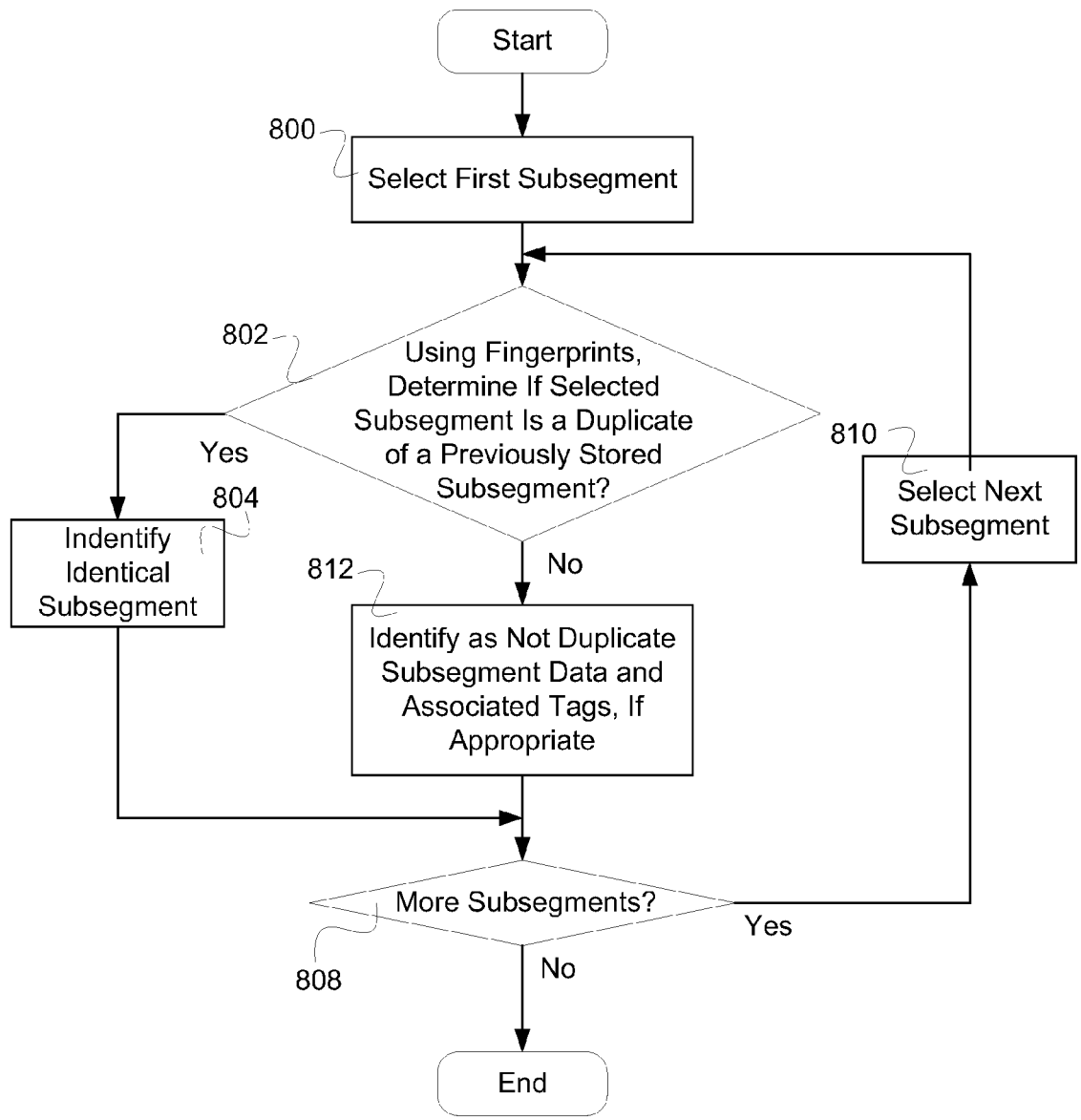
FIG. 8 is a flow diagram illustrating an embodiment of a process for finding duplicate subsegments among previously stored subsegments.

FIG. 8 is a flow diagram illustrating an embodiment of a process for finding duplicate subsegments among previously stored subsegments. In some embodiments, the process of FIG. 8 is used to implement 708 of FIG. 7. In the example shown, in 800 a first subsegment is selected. In 802, it is determined if the selected subsegment is a duplicate of a previously stored subsegment. In some embodiments, the selected subsegment is determined to be a duplicate or not of a previously stored subsegment using fingerprints. If the selected subsegment is a duplicate, then in 804 the subsegment is identified as identical and control passes to 808. If the selected subsegment is not a duplicate, then in 812 subsegment data and associated tags (e.g., which include fingerprints) are identified as not duplicate, if appropriate, and control passes to 808. In some embodiments, the identified subsegment data and associated tags are stored to be used for reconstruction of the segment. In some embodiments, in cases where a sliding window is used to identify subsegments, then it may not be necessary to store a given selected subsegment and associated tags. In 808, it is determined if there are more subsegments. If there are more subsegments, then a next subsegment is selected in 810 and control passes to 802. If there are not more subsegments, then the process ends.

Figure 9:
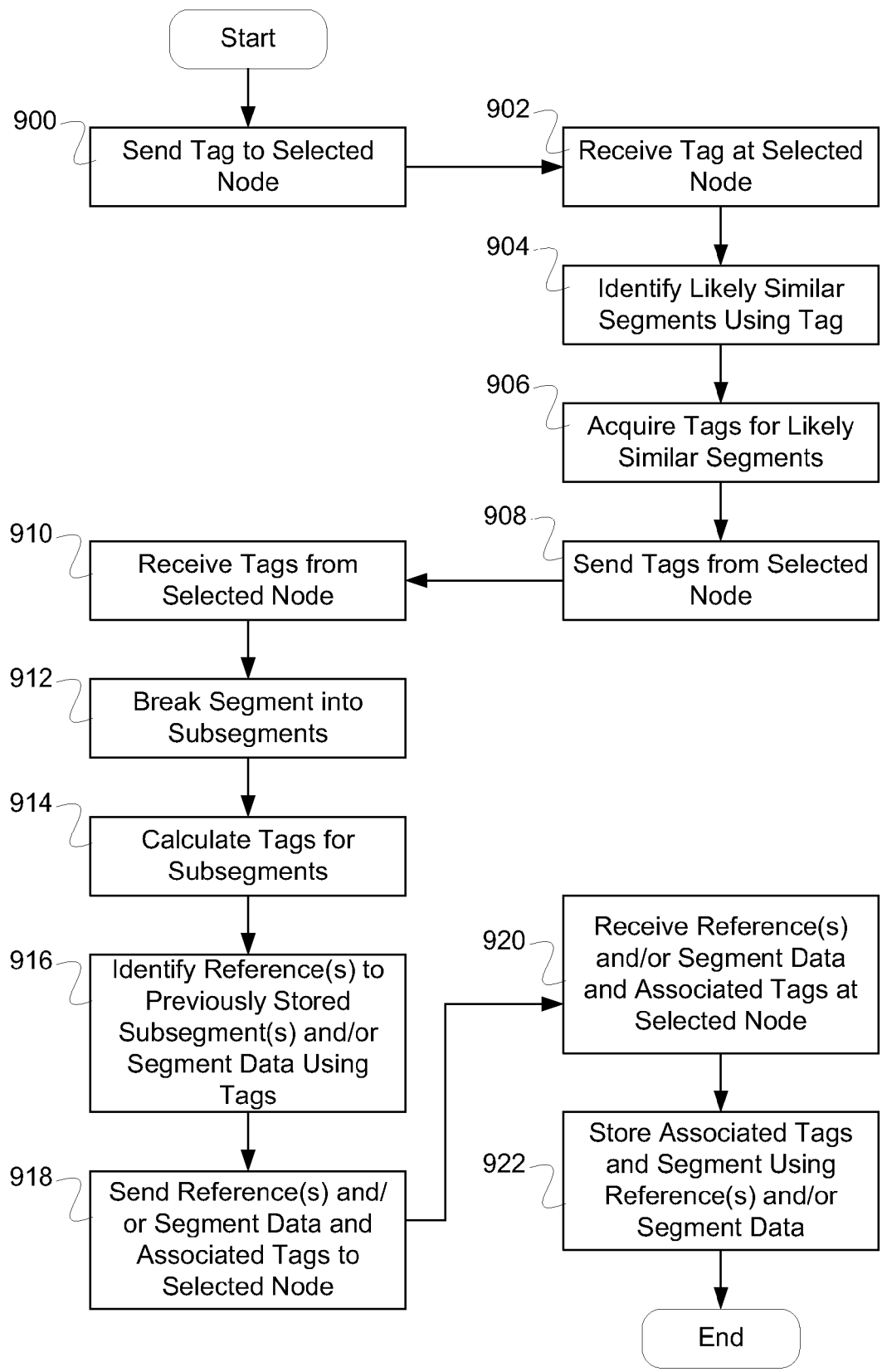
FIG. 9 is a flow diagram illustrating an embodiment of a process for storing a representation of a segment.

FIG. 9 is a flow diagram illustrating an embodiment of a process for storing a representation of a segment. In some embodiments, the process of FIG. 9 is used to implement 408 of FIG. 4. In the example shown, in 900 the tag is sent to the selected node. In 902, the tag is received at the selected node. In 904, likely similar segments are identified using the tag. In 906, tags are acquired for the likely similar segments. In some embodiments, tags include fingerprints. In various embodiments, the tags are read from the selected node's storage or the tags are calculated on the fly as needed. In some embodiments, the tags are stored together for convenient and fast acquisition. In 908, tags are sent from selected node. In 910, tags are received from selected node. In 912 the segment is broken into subsegments. In 914, tags are calculated for the subsegments. In 916, reference(s) to previously stored subsegment(s) and/or segment data are identified using tags. In some embodiments, fingerprints are used to determine if a subsegment is a duplicate of a previously stored subsegment. In 918, the reference(s) and/or segment data and associated tags are sent to the selected node. In 920, the reference(s) and/or segment data and associated tags are received at the selected node. In 922, store associated tags and segment using reference(s) and/or segment data.

Figure 10:
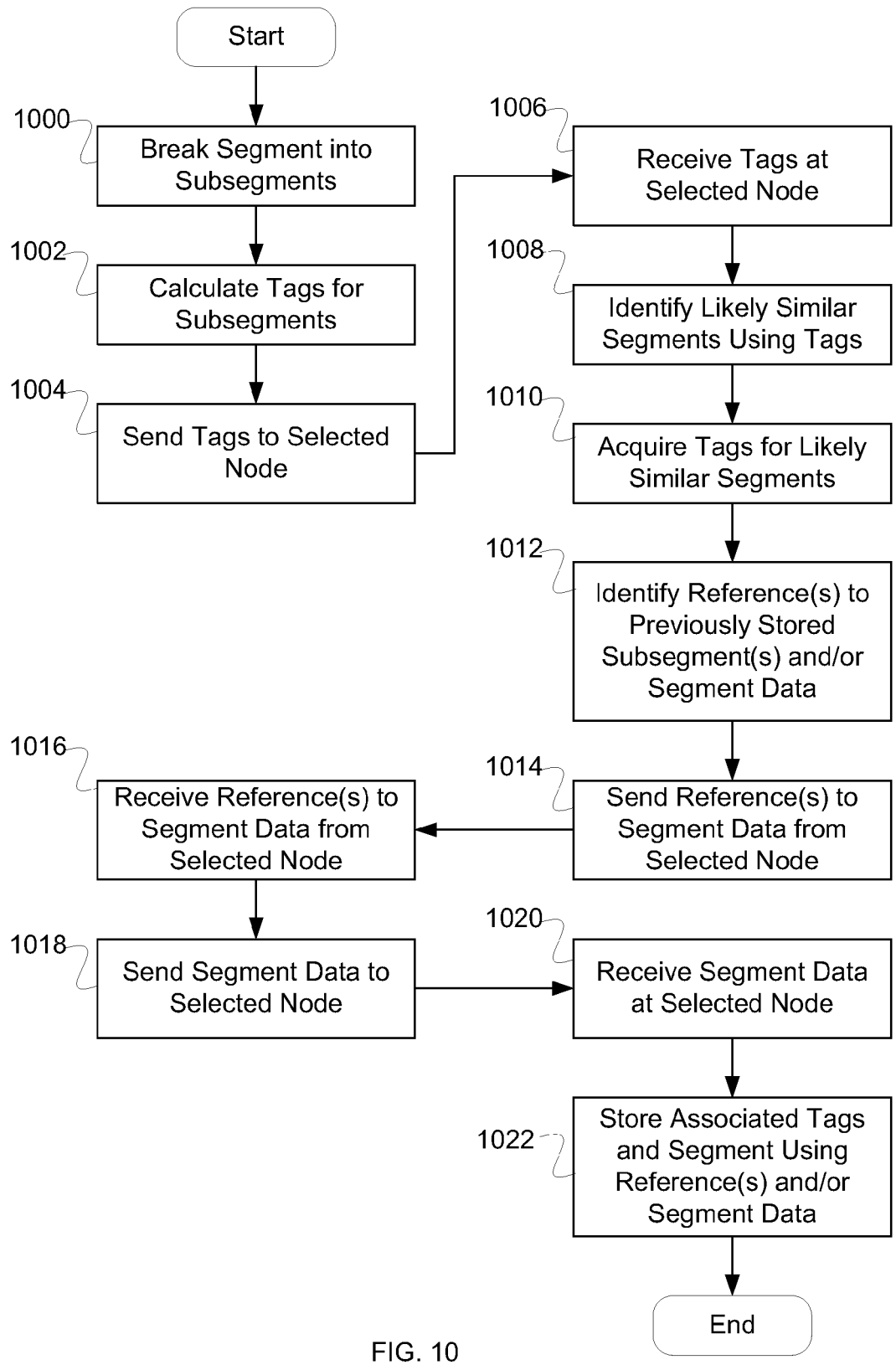
FIG. 10 is a flow diagram illustrating an embodiment of a process for storing a representation of a segment.

FIG. 10 is a flow diagram illustrating an embodiment of a process for storing a representation of a segment. In some embodiments, the process of FIG. 10 is used to implement 408 of FIG. 4. In the example shown, in 1000 the segment is broken into subsegments. In 1002, tags are calculated for the subsegments. In some embodiments, the tags include fingerprints. In 1004, tags are sent to selected node. In 1006, tags are received at selected node. In 1008, likely similar segments are identified using tags. In 1010, tags are acquired for likely similar segments. In some embodiments, tags include fingerprints. In various embodiments, the tags are read from the selected node's storage or the tags are calculated on the fly as needed. In some embodiments, the tags are stored together for convenient and fast acquisition. In 1012, reference(s) to previously stored subsegment(s) and/or segment data are identified using tags. In some embodiments, fingerprints are used to determine if a subsegment is a duplicate of a previously stored subsegment. In 1014, reference(s) to segment data is/are sent from selected node. In some embodiments, tags are used to reference segment data. In some embodiments, subsegment tags are sent from the node as references to subsegments. In 1016, reference(s) to segment data is/are received from selected node. In 1018, segment data is sent to selected node.

In 1020, segment data is received at selected node. In 1022, associated tags and segment are stored using reference(s) and/or segment data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of data storage systems;
   a processor configured to:
   break a data stream or a data block into a plurality of segments that includes at least a first segment;
   compute a tag for the first segment, wherein the tag comprises a summary feature set, a sketch, a hash or a fingerprint for at least a portion of the first segment;
   send the tag to each data storage system of at least a subset of the plurality of data storage systems, wherein a data storage system of the at least the subset of the plurality of data storage systems that receives the tag determines, based at least in part on the tag, whether the data storage system of the at least the subset of the plurality of data storage systems contains at least one segment that is similar to the first segment or at least one subsegment that is identical to a subsegment of the first segment;
   receive an indication from each data storage system that includes a measure of at least one of: a number of similar segments stored at each data storage system, a number of identical subsegments stored at each data storage system, or a total number of segments stored at each data storage system;
   select a specific data storage system of the at least the subset of the plurality of the data storage systems to store the first segment based at least in part on the indication;
   determine whether a portion of the first segment that is smaller than the first segment is a duplicate of a portion of a second segment stored at the specific data storage system; and
   store the first segment at least in part by storing a representation of the duplicate portion of the first segment; and
   a memory coupled to the processor and configured to provide the processor with instructions.

2. A system as in claim 1, wherein each data storage system includes a summary data structure that is used to determine whether the data storage system of the at least the subset of the plurality of data storage systems contains at least one similar segment or one identical segment.

3. A system as in claim 1, wherein the data stream associated with the first segment comprises one or more of the following: a file, a plurality of files that are related to each other, a directory of files, or a plurality of segments that are related to each other.

4. A system as in claim 1, wherein the data stream is associated with the first segment by providing an indication identifying the data stream to the specific data storage system storing the segment.

5. A system as in claim 4, wherein segments associated with the data stream that are caused to be stored on the specific data storage system are caused to be stored by causing one or more subsegments to be stored, and wherein the segments associated with the data stream that are caused to be stored on the specific data storage system such that the segments can be retrieved together efficiently.

6. A system as in claim 1, wherein the processor is further configured to store the first segment using segment data that is not a duplicate of previously stored data.

7. A system as in claim 1, wherein the processor is further configured to find duplicates for a second portion of the first segment within other segments being managed by the plurality of data storage systems.

8. A system as in claim 1, wherein the specific data storage system manages a subset of the segments stored in the plurality of data storage systems.

9. A system as in claim 1, wherein determining that the portion of the first segment smaller than the first segment is the duplicate of the portion of the specific data storage system stored segment includes breaking the first segment into a plurality of subsegments and identifying one subsegment of the plurality of subsegments that has already been stored by the specific data storage system.

10. A system as in claim 1, wherein a subsegment reference is stored on more than one data storage system so that subsegment references can be read sequentially.

11. A system as in claim 1, wherein the portion of the segment smaller than the segment is stored on more than one data storage system of the plurality of data storage systems so that the portion of the segment can be read sequentially.

12. A method as in claim 1, wherein breaking the data stream or the data block into segments is based at least in part on content of the data stream or the data block.

13. A system as in claim 1, wherein breaking the data stream or the data block into segments is based at least in part on file boundaries within the data stream or the data block.

14. A system as in claim 1, wherein breaking the data stream or the data block into segments is based at least in part on an anchoring function, wherein the anchoring function includes determining if the computed hash meets one or more predetermined criteria.

15. A system as in claim 1, wherein breaking the data stream or the data block into segments is based at least in part on an anchoring function, wherein the anchoring function includes uses a value of a function calculated for a plurality of windows within a segmentation window.

16. A method, comprising:
    breaking a data stream or a data block into a plurality of segments that includes at least a first segment;
    computing, using a processor, a tag for the first segment, wherein the tag comprises a summary feature set, a sketch, a hash or a fingerprint for at least a portion of the first segment;
    sending the tag to each data storage system of at least a subset of the plurality of data storage systems, wherein a data storage system of the at least the subset of the plurality of data storage systems that receives the tag determines, based at least in part on the tag, whether the data storage system of the at least the subset of the plurality of data storage systems contains at least one segment that is similar to the first segment or at least one subsegment that is identical to a subsegment of the first segment;
    receiving an indication from each data storage system that includes a measure of at least one of: a number of similar segments stored at each data storage system, a number of identical subsegments stored at each data storage system, or a total number of segments stored at each data storage system;
    selecting a specific data storage system of the at least the subset of the plurality of the data storage systems to store the first segment based at least in part on the indication;

determining whether a portion of the first segment that is smaller than the first segment is a duplicate of a portion of a second segment stored at the specific data storage system; and storing the first segment at least in part by storing a representation of the duplicate portion of the first segment.

17. A computer program product, the computer program product being embodied in a non-transitory computer readable medium and comprising computer instructions for:

breaking a data stream or a data block into a plurality of segments that includes at least a first segment;

computing a tag for the first segment, wherein the tag comprises a summary feature set, a sketch, a hash or a fingerprint for at least a portion of the first segment;

sending the tag to each data storage system of at least a subset of the plurality of data storage systems, wherein a data storage system of the at least the subset of the plurality of data storage systems that receives the tag determines, based at least in part on the tag, whether the data storage system of the at least the subset of the plurality of data storage systems contains at least one segment that is similar to the first segment or at least one subsegment that is identical to a subsegment of the first segment;

receiving an indication from each data storage system that includes a measure of at least one of: a number of similar segments stored at each data storage system, a number of identical subsegments stored at each data storage system, or a total number of segments stored at each data storage system;

selecting a specific data storage system of the at least the subset of the plurality of the data storage systems to store the first segment based at least in part on the indication;

determining whether a portion of the first segment that is smaller than the first segment is a duplicate of a portion of a second segment stored at the specific data storage system; and storing the first segment at least in part by storing a representation of the duplicate portion of the first segment.

* * * * *